United States Patent
Miura et al.

(10) Patent No.: US 8,033,605 B2
(45) Date of Patent: Oct. 11, 2011

(54) VEHICLE SEATS

(75) Inventors: Kazuya Miura, Kariya (JP); Tomoya Hirakawa, Kariya (JP); Kazuhiro Hibi, Kariya (JP)

(73) Assignee: Toyota Shatai Kabushiki Kaisha, Aichi-Ken (JP)

( * ) Notice: Subject to any disclaimer, the term of this patent is extended or adjusted under 35 U.S.C. 154(b) by 272 days.

(21) Appl. No.: 12/235,851

(22) Filed: Sep. 23, 2008

(65) Prior Publication Data

US 2009/0096265 A1 Apr. 16, 2009

(30) Foreign Application Priority Data

Sep. 26, 2007 (JP) ................................. 2007-249144

(51) Int. Cl.
*B60N 2/04* (2006.01)
*B60N 2/24* (2006.01)
*A47C 1/08* (2006.01)

(52) U.S. Cl. .............. 297/344.14; 297/344.24; 297/253; 296/65.07; 296/65.12

(58) Field of Classification Search ............. 297/344.24, 297/253, 344.14, 344.17; 296/65.06, 65.07, 296/65.11, 65.12
See application file for complete search history.

(56) References Cited

U.S. PATENT DOCUMENTS

| | | | |
|---|---|---|---|
| 6,082,818 A * | 7/2000 | Muller | 297/250.1 |
| 6,390,560 B1 * | 5/2002 | Gandhi et al. | 297/463.1 |
| 6,478,376 B2 * | 11/2002 | Hayashi et al. | 297/250.1 |
| 6,543,848 B1 * | 4/2003 | Suga et al. | 297/344.24 |
| 7,533,934 B2 * | 5/2009 | Foelster et al. | 297/253 |
| 2004/0080194 A1 * | 4/2004 | Medvecky et al. | 297/253 |
| 2007/0222267 A1 * | 9/2007 | Tsujimoto et al. | 297/344.24 |

FOREIGN PATENT DOCUMENTS

| CA | 2515310 A1 * | 2/2004 |
|---|---|---|
| EP | 808740 A2 * | 11/1997 |
| JP | 2005014672 | 1/2005 |

\* cited by examiner

*Primary Examiner* — David Dunn
*Assistant Examiner* — Tania Abraham
(74) *Attorney, Agent, or Firm* — Patterson Thuente Christensen Pedersen P.A.

(57) ABSTRACT

A vehicle seat may include a seat main body having a seat cushion, a rotation mechanism that is arranged and constructed to horizontally rotate the seat main body with respect to a vehicle floor, a vertically moving mechanism that is arranged and constructed to vertically move the seat main body while moving the seat main body between vehicle interior and vehicle exterior, and a seat support that is capable of attaching the seat main body to the vertically moving mechanism. A cushion frame of the seat cushion is composed of a pair of longitudinal side frame elements, an anchor frame positioned between the side frame elements and anchor members attached to the anchor frame. The anchor frame is connected to the seat support via reinforcement members.

2 Claims, 13 Drawing Sheets

VEHICLE SEATS

This application claims priority to Japanese patent application serial number 2007-249144, the contents of which are incorporated herein by reference.

BACKGROUND OF THE INVENTION

This invention relates to a vehicle seat. More particularly, the present invention relates to a vehicle seat suitable for a welfare vehicle in which an elderly person, a physically handicapped person or other such persons (hereinafter simply referred to as "occupant") is capable of easy getting in and out of a vehicle.

A vehicle seat is taught by, for example, Japanese Laid-Open Patent Publication No. 2005-14672. This vehicle seat includes a seat main body having a seatbelt, a first sliding mechanism that is capable of slide the seat main body in forward and rearward directions of a vehicle with respect to a vehicle floor, and a rotation mechanism that is capable of horizontally rotating the seat main body through an angle of 90 degrees between a forwardly facing position where it faces a front side of a vehicle and a laterally facing position where it faces a door opening of the vehicle.

This vehicle seat further includes a vertically moving mechanism that is positioned between the seat main body and the rotation mechanism. The vertically moving mechanism includes a second sliding mechanism and a pair of four-bar linkage mechanisms, so as to vertically and laterally move the seat main body between vehicle interior and vehicle exterior via a door opening while the seat main body is in the laterally facing position.

In addition, this vehicle seat includes a third sliding mechanism that is positioned between the seat main body and the vertically moving mechanism, so as to laterally slide the seat main body independently of the second sliding mechanism of the vertically moving mechanism.

According to the vehicle seat thus constructed, the seat main body can be moved between vehicle interior and vehicle exterior via the door opening while the seat main body is rotated to the laterally facing position. As a result, an occupant can easily get in and out of the vehicle.

Further, the vehicle seat includes a fixture mechanism (an force transmitting mechanism) in order to effectively anchor or affix the vehicle seat (the seat main body) to the vehicle floor when a large (inertial) force (which force may be referred to as a seatbelt loading) is unexpectedly applied to the seat main body via the occupant sitting on the seat main body. Such a large seatbelt loading can be produced, for example, when a vehicle collision, in particular, a front-side collision happens. The fixture mechanism is composed of a first fixture unit positioned between the seat main body and the vertically moving mechanism and a second fixture unit positioned between the vertically moving mechanism and the vehicle floor. The first and second fixture units are arranged and constructed to engage each other when the large force is applied to the seat main body, so as to affix the vehicle seat (the seat main body) to the vehicle floor.

Therefore, according to the vehicle seat thus constructed, the vehicle seat (the seat main body) can be rigidly integrated with the vehicle floor even if the large force is applied to the seat main body. That is, the vehicle seat (the seat main body) cannot be moved on the vehicle floor even if the large force is applied to the seat main body. As a result, the occupant sitting on the seat main body can be reliably restrained with respect to the vehicle floor.

Generally, the vehicle seat (the seat main body) is designed such that a child seat (a safety seat) can be attached thereto. That is, as shown in FIGS. 12 and 13, the seat main body (which is shown by a reference numeral 250) includes a cushion frame 210. The cushion frame 210 is composed of a pair of (left and right) longitudinal side frame elements 204 and an anchor frame 205. The anchor frame 205 is positioned between rear ends of the side frame elements 204 and is connected thereto at both ends thereof. The anchor frame 205 is provided with a pair of anchor members (child seat attachment members) 206 that are positioned spaced away from each other. The vehicle seat (the seat main body 250) further includes a support frame (a seat support) 200. The support frame 200 is composed of a pair of (left and right) longitudinal frame elements 201 positioned in parallel with each other and a pair of (front and rear) lateral frame elements 202 and 203 positioned in parallel with each other. Both ends of each of the frame elements 202 and 203 are respectively connected to the side frame elements 204 of the cushion frame 210 so that the cushion frame 210 can be integrated with the support frame 200.

According to the vehicle seat thus designed, the child seat can be attached to the seat main body 250 utilizing the anchor members 206. However, for example, when the vehicle collision happens, a large (inertial) force (which force will be hereinafter referred to as a safety seat loading) can be applied to the child seat. When the large force is applied to the child seat, as shown by dot-line arrows P in FIG. 13, the force can be transmitted to the rear lateral frame element 203 of the support frame 200 via the anchor members 206, the anchor frame 205 and the side frame elements 204. The force thus transmitted can be converted to upward moments as shown by outline arrows M in FIG. 13. The upward moments thus produced are respectively applied to both ends of the rear lateral frame element 203, so that the rear lateral frame element 203 can be deformed or damaged. Upon deformation or damaging of the rear lateral frame element 203, the cushion frame 210 can be displaced with respect to the support frame 200. As a result, the seat main body 250 can be moved in the vehicle seat. That is, the seat main body 250 can be moved with respect to the vehicle floor. Thus, the child seat attached to the seat main body 250 cannot be reliably restrained or immobilized with respect to the vehicle floor. This means that an occupant (baby or infant) sitting on the child seat cannot be reliably restrained or immobilized with respect to the vehicle floor.

Therefore, the known vehicle seat 1 till is in need of improvement. Thus, there is a need in the art for an improved vehicle seat.

BRIEF SUMMARY OF THE INVENTION

For example, in one embodiment of the present invention, a vehicle seat may include a seat main body having a seat cushion, a rotation mechanism that is arranged and constructed to horizontally rotate the seat main body with respect to a vehicle floor, a vertically moving mechanism that is arranged and constructed to vertically move the seat main body while moving the seat main body between vehicle interior and vehicle exterior, and a seat support that is capable of attaching the seat main body to the vertically moving mechanism. A cushion frame of the seat cushion is composed of a pair of longitudinal side frame elements, an anchor frame positioned between the side frame elements and anchor members attached to the anchor frame. The anchor frame is connected to the seat support via reinforcement members such that a force applied to the anchor frame via the anchor members can be transmitted to the seat support via the reinforcement members. The seat support is arranged and constructed such that a rear portion thereof is capable of engaging the vertically moving mechanism.

According to the vehicle seat thus constructed, when a large external (inertial) force is applied to a child seat attached to the seat main body using the anchor members, the force can be effectively transmitted to the seat support via the anchor members, the anchor frame and the reinforcement members. That is, the force cannot substantially be transmitted to the side frame elements of the cushion frame. This means that the force can substantially be transmitted to a central portion of the seat support and not to end portions thereof. That is, no upward moments can be produced on the end portions of the seat support. Therefore, the seat support can withstand the force, so as to be prevented from being deformed or damaged. As a result, the seat main body can be effectively prevented from moving in the vehicle seat. That is, the seat main body can be prevented from moving with respect to the vehicle floor. Therefore, the child seat attached to the seat main body can be reliably restrained or immobilized with respect to the vehicle floor. Thus, an occupant (baby or infant) sitting on the child seat can be reliably restrained or immobilized with respect to the vehicle floor.

Further, the seat support can be effectively held by the vertically moving mechanism because the rear portion of the seat support is capable of engaging the vertically moving mechanism. Therefore, when the force is transmitted to the seat support, the seat support can further effectively withstand the force, so as to be further prevented from being deformed or damaged.

Other objects, features, and advantages, of the present invention will be readily understood after reading the following detailed description together with the accompanying drawings and the claims.

DETAILED DESCRIPTION OF THE INVENTION

In the following, a detailed representative embodiment of the present invention will be described with reference to FIG. 1 to FIG. 11.

Figure 1:
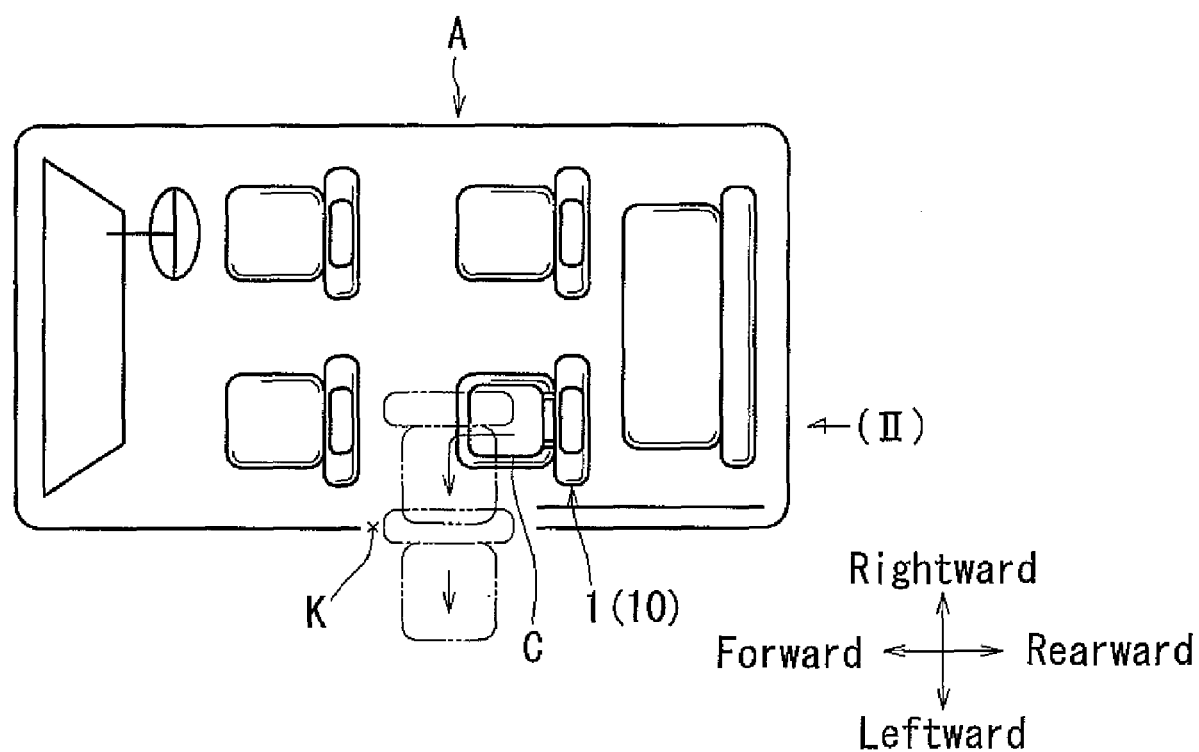
FIG. 1 is a plan view of a vehicle having a vehicle seat according to a representative embodiment of the present invention.
Figure 3:
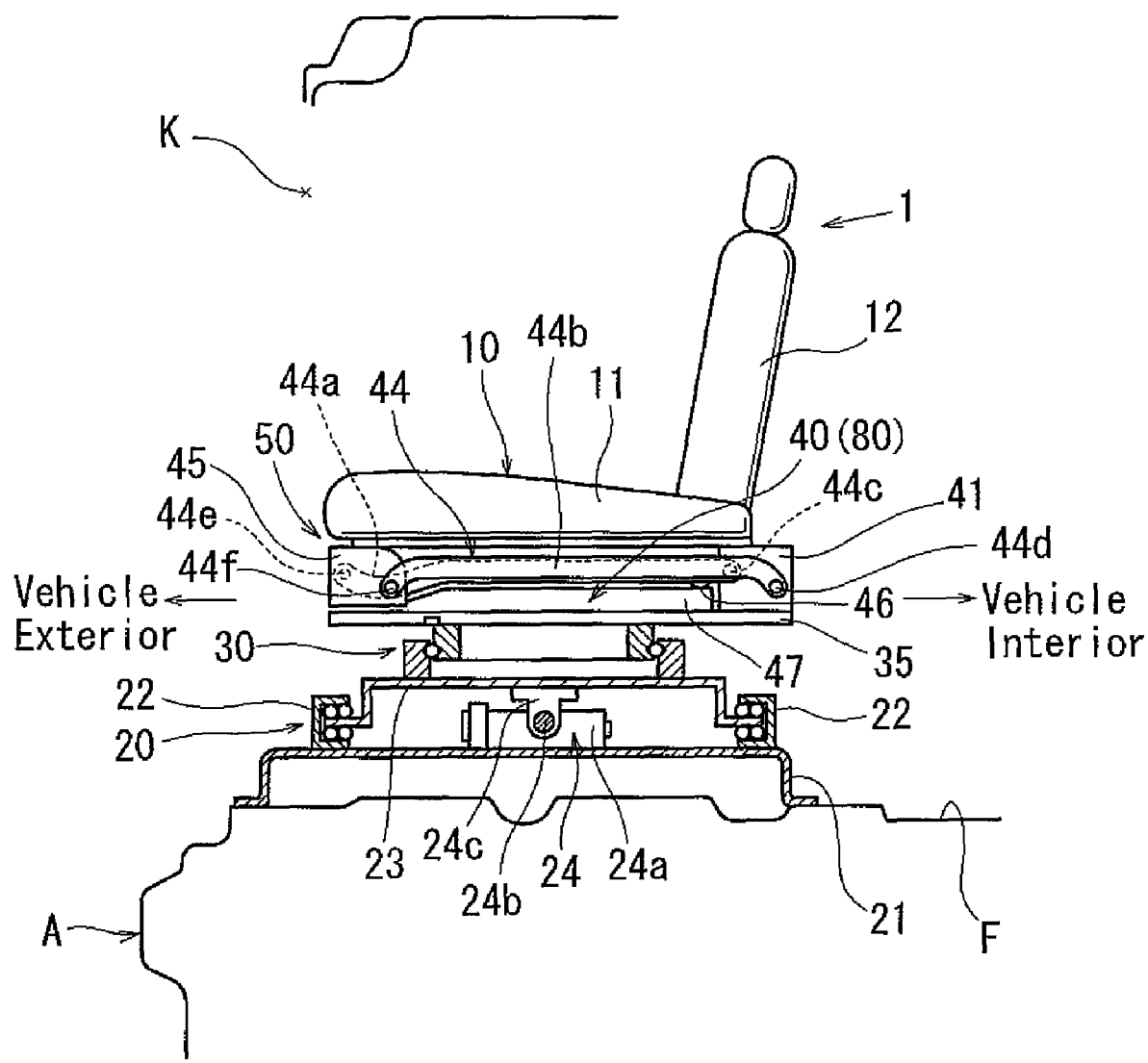
FIG. 3 is a side view of the vehicle seat, which illustrates movement of the vehicle seat.
Figure 4:
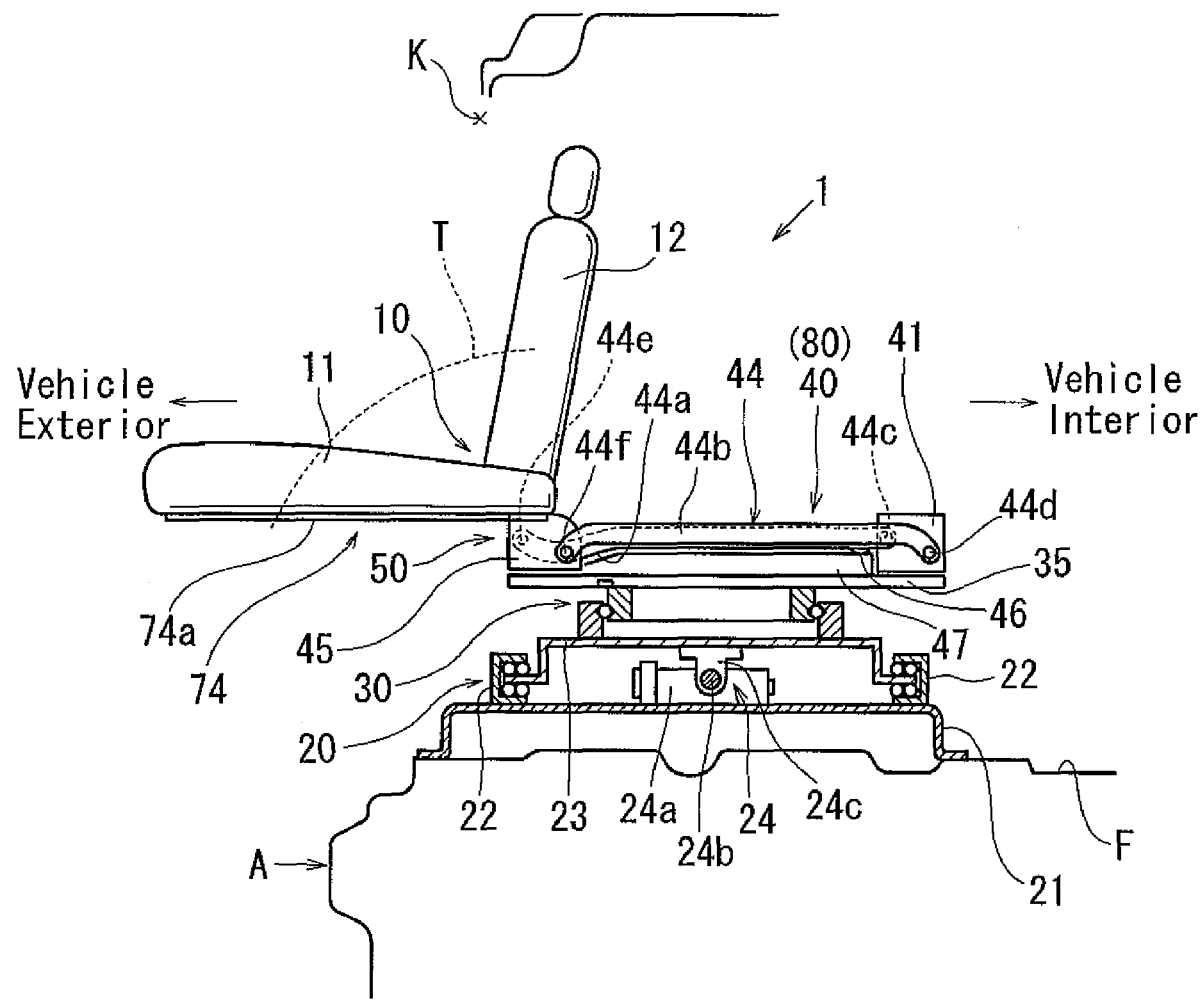
FIG. 4 is a side view of the vehicle seat, which illustrates the movement of the vehicle seat.
Figure 5:
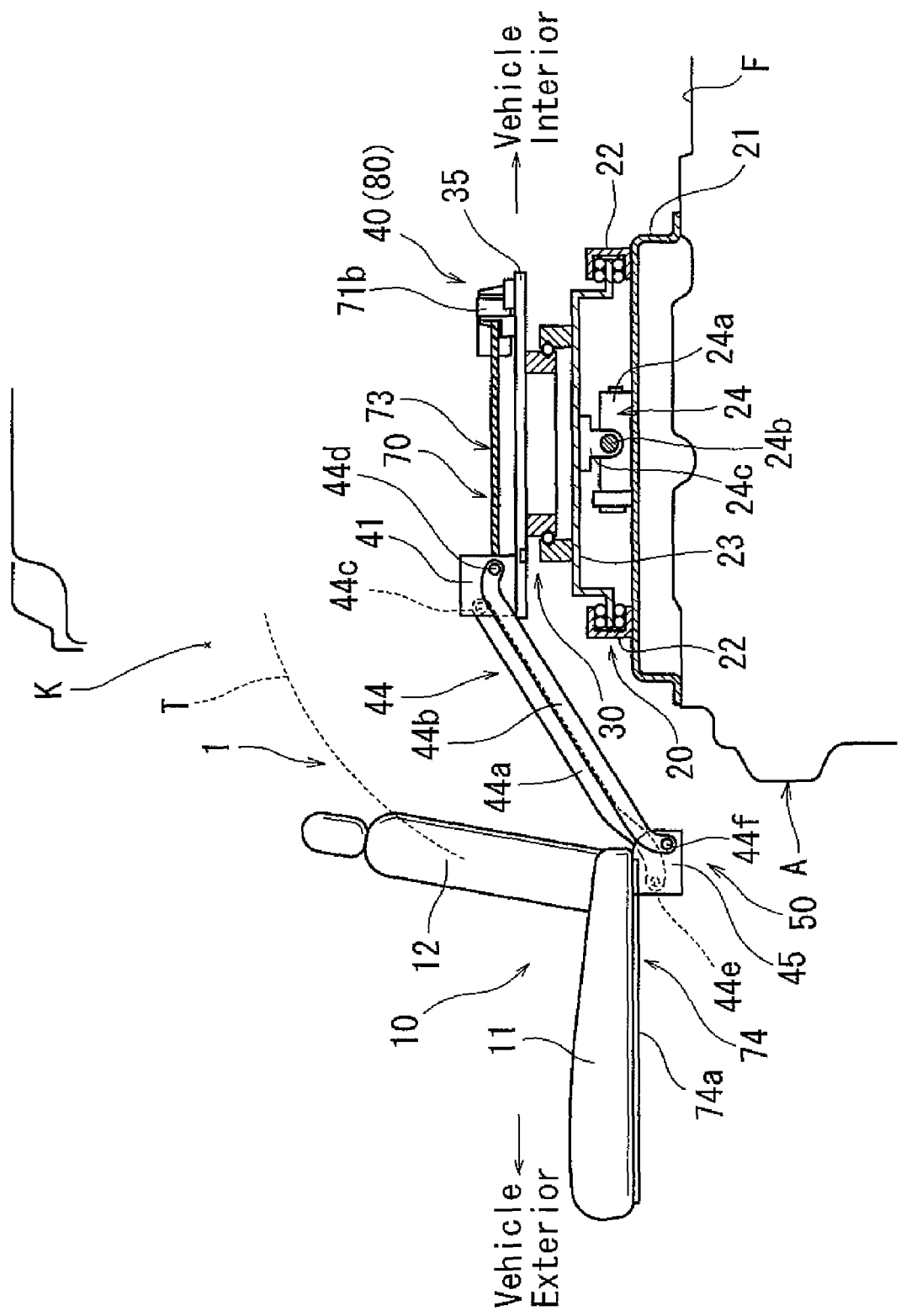
FIG. 5 is a side view of the vehicle seat, which illustrates the movement of the vehicle seat.

As shown in FIG. 1, a rear (second row) left seat of a vehicle A is exemplified as a vehicle seat 1 according to the representative embodiment. The vehicle seat 1 may preferably include a seat main body 10. In the vehicle seat 1, the seat main body 10 can horizontally move or rotate through an angle of 90 degrees between a forwardly facing position (shown by solid lines in FIG. 1) where it faces forwardly of the vehicle A and a laterally facing position (shown by broken lines in FIG. 1) where it faces a door opening K of the vehicle A. Further, the seat main body 10 can laterally move at the laterally facing position, so as to move between vehicle interior and vehicle exterior via the door opening K (FIGS. 3 and 4). Further, the seat main body 10 can vertically move (i.e., move up and down) in the vehicle exterior, so as to move between an upper position and a lower position (FIGS. 4 and 5). As will be recognized, when the seat main body 10 is in the lower position, a person can easily get in and out of the seat main body 10.

When the person gets out of the vehicle A, the seat main body 10 is moved from the vehicle interior to the vehicle exterior after it is rotated to the laterally facing position in the vehicle interior. Thereafter, the seat main body 10 is moved downwardly toward the lower position such that the person can get out of the seat main body 10. This allows the person to get out of the vehicle A. To the contrary, when the person gets into the vehicle A, the seat main body 10 is moved to the lower position such that the person can get in the seat main body 10. After the person gets in and sits on the seat main body 10, the seat main body 10 is moved in the reverse order. This allows the person to get into the vehicle A.

In order to move the seat main body 10 as described above, the vehicle seat 1 may preferably include a longitudinal sliding mechanism 20 disposed on a vehicle floor F, a rotation mechanism 30 that is disposed on the longitudinal sliding mechanism 20, a vertically moving mechanism 80 that is disposed on the rotation mechanism 30, and a main or first lateral sliding mechanism 50 that is disposed on the vertically moving mechanism 80. Further, the seat main body 10 may preferably be disposed on the first lateral sliding mechanism 50.

Figure 9:
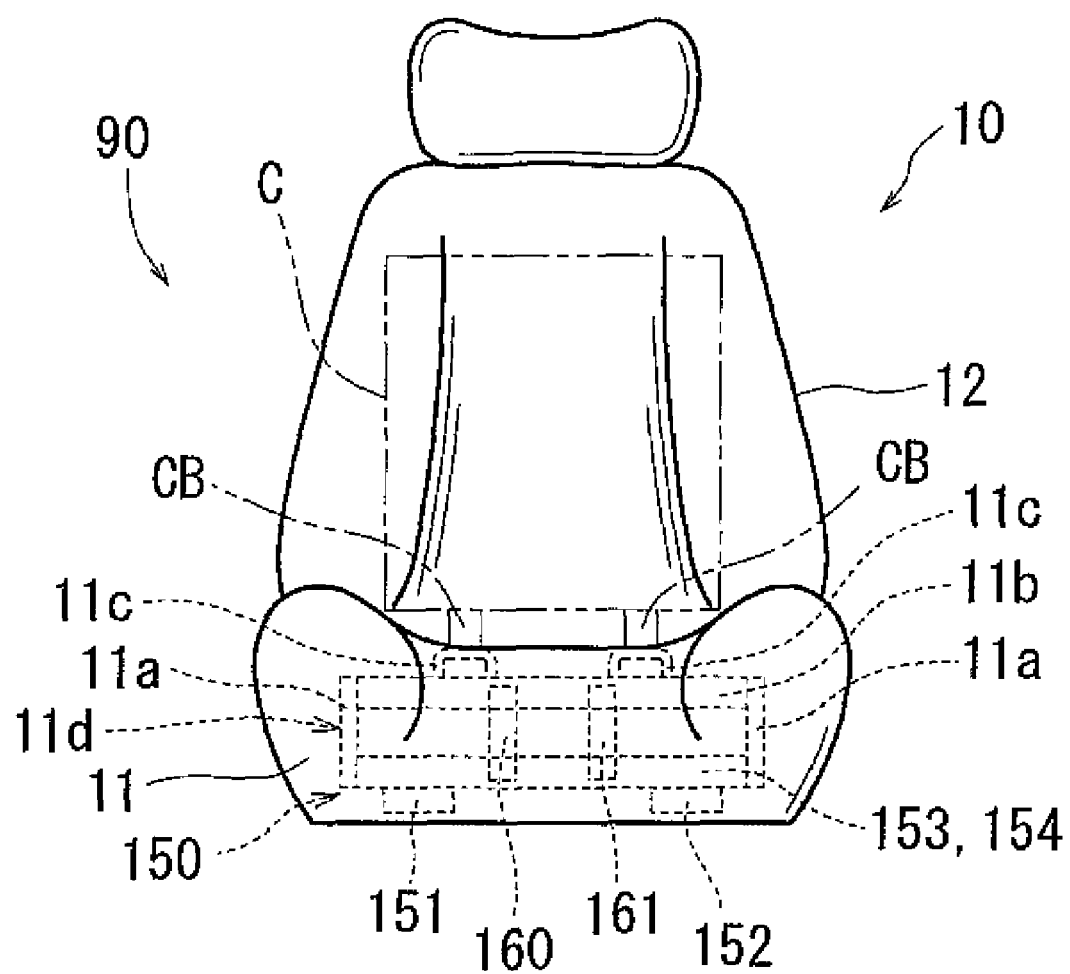
FIG. 9 is an elevational view of the vehicle seat.
Figure 10:
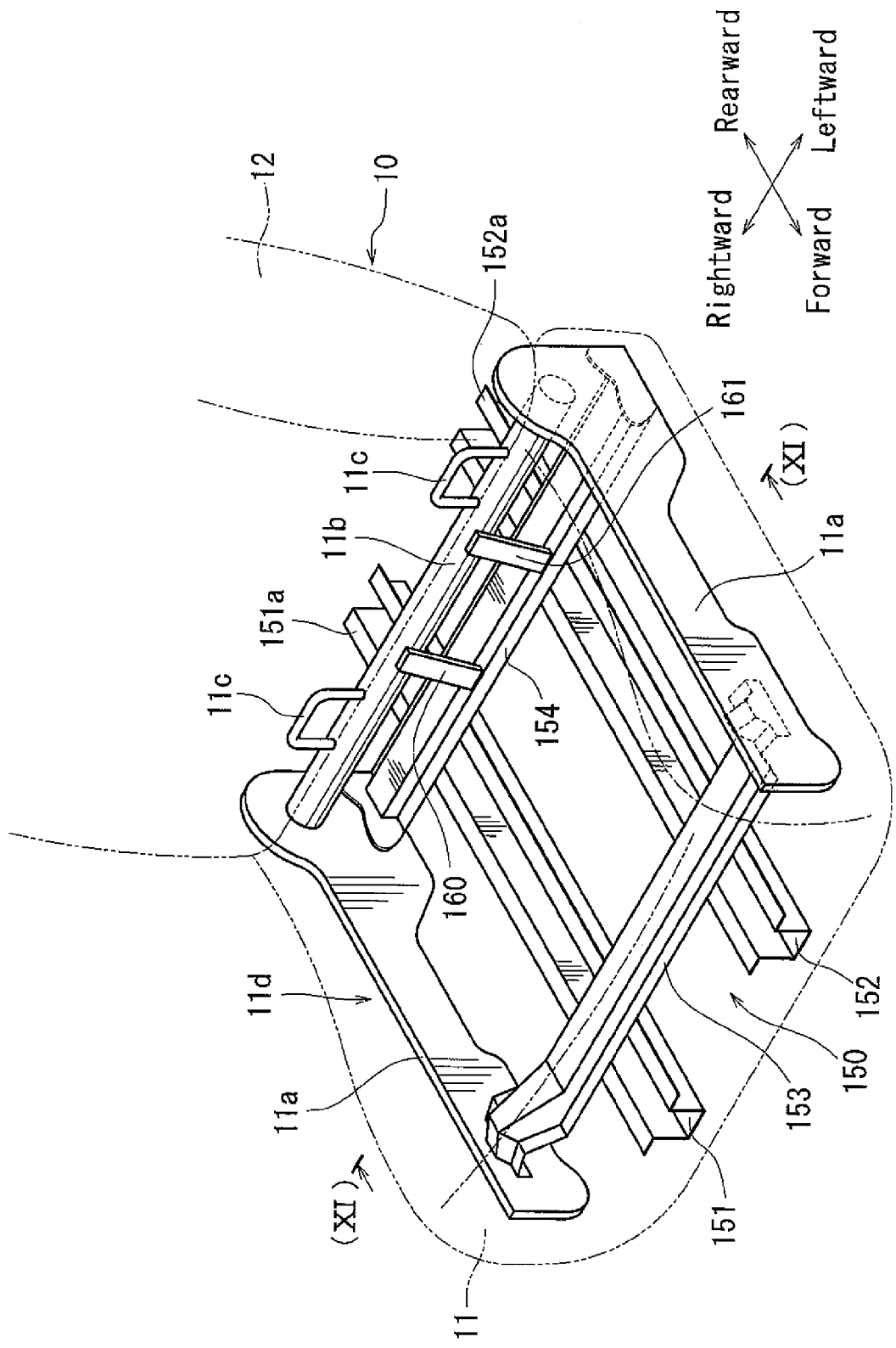
FIG. 10 is a perspective view of a seat main body of the vehicle seat, which illustrate a cushion frame and a support frame.

As shown in FIG. 9, the seat main body 10 is designed such that a child seat (a safety seat) C can be attached thereto. As best shown in FIG. 10, the seat main body 10 may preferably include a seat cushion 11 and a seat back 12. The seat cushion 11 may preferably include a cushion frame 11d. The cushion frame 11d is composed of a pair of (left and right) longitudinal side frame elements 11a and an anchor frame 11b. The anchor frame 11b is laterally positioned between rear ends of the side frame elements 11a and is connected thereto at both ends. The anchor frame 11b is provided with a pair of anchor members (safety seat attachment members) 11c that are positioned laterally spaced away from each other.

As best shown in FIG. 10, the vehicle seat 1 (the seat main body 10) further includes a support frame (seat support) 150. The support frame 150 is composed of a pair of (left and right) longitudinal frame elements 151 and 152 positioned in parallel with each other and a pair of (front and rear) lateral frame elements 153 and 154 positioned in parallel with each other. The lateral frame elements 153 and 154 are disposed on the longitudinal frame elements 151 and 152 and are connected thereto. The support frame 150 thus constructed is positioned between the side frame elements 11a of the cushion frame 11d such that the lateral frame elements 153 and 154 extend therebetween in parallel with the anchor frame 11b. Further, both ends of each of the lateral frame elements 153 and 154 are respectively connected to the side frame elements 11a of the cushion frame 11d, so that the cushion frame 11d can be integrated with the support frame 150.

As described above, the cushion frame 11d can be integrated with the support frame 150 while the anchor frame 11b is positioned in parallel with the rear lateral frame element 154. In addition, as best shown in FIG. 10, the anchor frame 11b and the rear lateral frame element 154 thus positioned are connected to each other via reinforcement members 160 and 161 that vertically extend between the anchor frame 11b and the rear lateral frame element 154. The reinforcement members 160 and 161 may preferably be positioned so as to be laterally spaced away from each other. Also, the reinforcement members 160 and 161 may preferably positioned so as to be laterally inwardly spaced away from the anchor members 11c.

As will be appreciated, in order to attach the child seat C to the seat main body 10, attachment belts CB (FIG. 9) provided to the child seat C are connected to the anchor members 11c. Naturally, the child seat C is provided with a child seatbelt (not shown) such that the person (baby or infant) sitting on the child seat can be reliably restrained therein.

Figure 2:
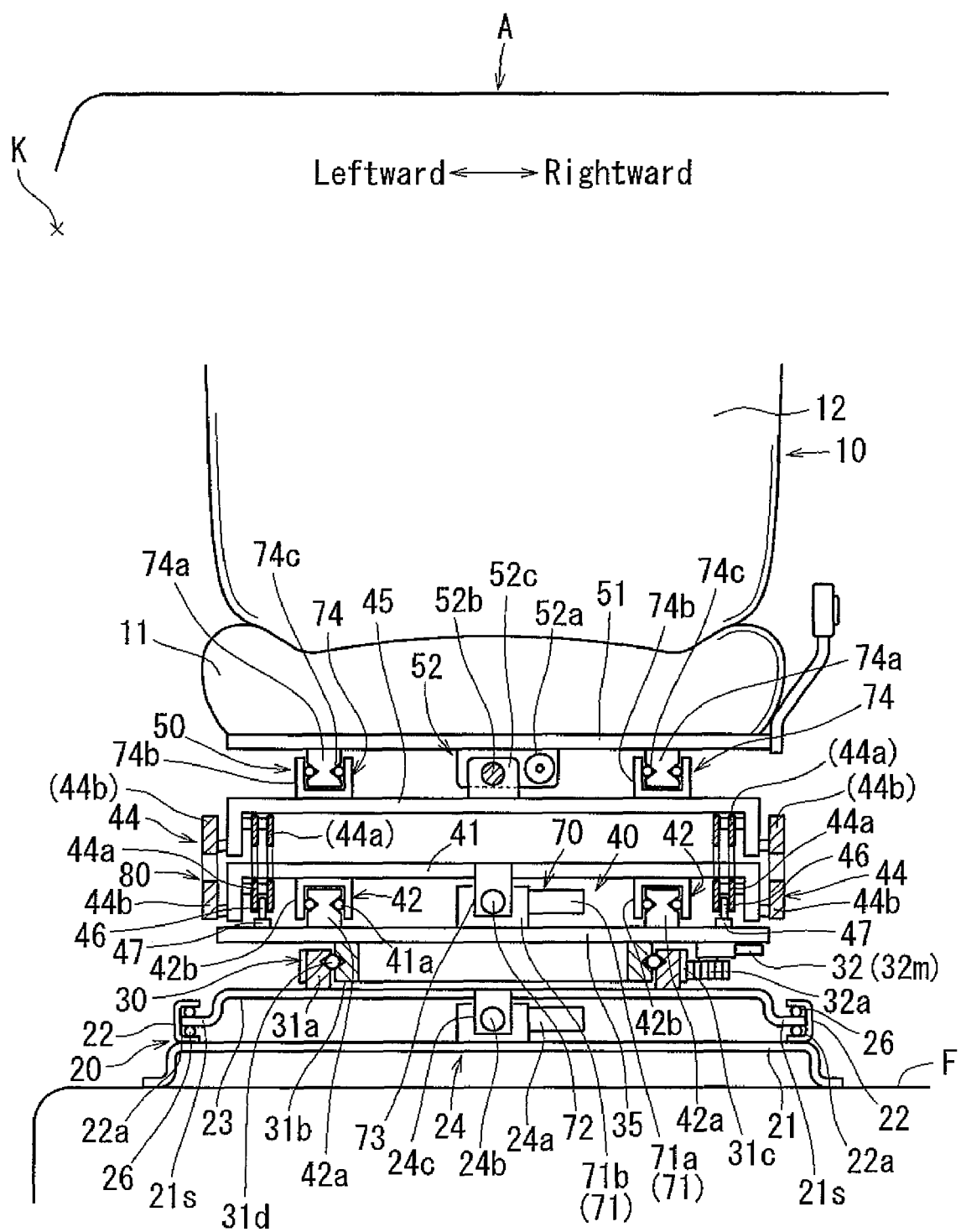
FIG. 2 is rear view of the vehicle seat, which is viewed along an arrow II of FIG. 1.

The longitudinal sliding mechanism 20 is intended to move the seat main body 10 forward and rearward relative to the vehicle A in the vehicle interior. As shown in FIG. 2, the longitudinal sliding mechanism 20 includes a pair of stationary rails 22, a longitudinal slide base 23 and a driving mechanism 24 as a drive source of the longitudinal sliding mechanism 20. The stationary rails 22 are fixedly attached to a stationary base 21 mounted on the vehicle floor F, so as to longitudinally extend in parallel with each other. The longitudinal slide base 23 longitudinally slidably engages the stationary rails 22.

As best shown in FIG. 2, the stationary rails 22 have engagement recesses 22a having a U-shape in cross section. Conversely, the longitudinal slide base 23 has a pair of linear engagement portions 21s that are formed in longitudinal peripheries thereof. The engagement portions 21s of the longitudinal slide base 23 engage the engagement recesses 22a via a plurality of bearing balls 26, so that the longitudinal slide base 23 can smoothly slide with respect to the stationary rails 22.

The driving mechanism 24 may preferably include a drive motor 24a attached to the stationary base 21, a threaded shaft 24b that is rotatably positioned on the stationary base 21, and a nut 24c that is fixedly attached to the longitudinal slide base 23. The threaded shaft 24b is positioned in parallel with the stationary rails 22. One end of the threaded shaft 24b is coaxially coupled to a drive shaft (not shown) of the drive motor 24a, so that the threaded shaft 24b can be rotated by the drive motor 24a. Further, the threaded shaft 24b threadably engages the nut 24c such that the nut 24c can move along the threaded shaft 24b when the threaded shaft 24b is rotated by the drive motor 24a. Therefore, when the drive motor 24a is rotated in normal and reverse directions, the longitudinal slide base 23 can move forward and backward relative to the vehicle A along the stationary rails 22.

The rotation mechanism 30 is intended to rotate the seat main body 10 between the forwardly facing position and the laterally facing position for an angular range of approximately 90 degrees in the vehicle interior. As shown in FIG. 2, the rotation mechanism 30 may preferably include an outer wheel 31a (support base) that is fixedly disposed on the longitudinal slide base 23 of the longitudinal sliding mechanism 20, an inner wheel 31b (rotatable base) that is positioned in the outer wheel 31a so as to be rotatable therein, a rotation base 35 that is disposed on the inner wheel 31b and is fixed thereto, and a driving mechanism 32 as a drive source of the rotation mechanism 30.

As shown in FIG. 2, an annular groove having a V-shape in cross section is formed in an outer circumferential surface of the inner wheel 31b. Similarly, a corresponding annular groove having a V-shape in cross section is formed in an inner circumferential surface of the outer wheel 31a. A plurality of bearing balls 31d are positioned between the V-shaped annular grooves of the inner and outer wheels 31a and 31b, so that the inner wheel 31b can smoothly rotate in the outer wheel 31a.

As shown in FIG. 2, the driving mechanism 32 may preferably include a drive motor 32m disposed on the rotation base 35, and an output gear 32a. The output gear 32a meshes a gear portion 31c formed in an outer circumferential surface of the outer wheel 31a so as to transmit rotational motion of the drive motor 32m to the outer wheel 31a. Therefore, upon actuation of the drive motor 32m, the rotation base 35 fixedly attached to the inner wheel 31b is capable of rotating with respect to the longitudinal slide base 23. As will be appreciated, upon rotation of the rotation base 35, the vertically moving mechanism 80, the first lateral sliding mechanism 50 and the seat main body 10 can be integrally rotated.

Next, the vertically moving mechanism 80 is intended to laterally move the seat main body 10 between the vehicle interior and the vehicle exterior and vertically move between the upper position and the lower position in the vehicle exterior. The vertically moving mechanism 80 has a second lateral sliding mechanism 40, a pair of (right and left) four-bar linkage mechanisms (vertically moving devices) 44 and a vertically moving base 45.

As shown in FIG. 2, the second lateral sliding mechanism 40 may preferably include a guide mechanism 42, a slide base 41 and a driving mechanism 70 as a drive source of the slide base 41. The guide mechanism 42 is composed of a pair of guide rails 42a that are disposed on the rotation base 35 in parallel with each other so as to extend along longitudinal peripheries thereof, and a pair of slide members 42b that are respectively slidably attached to the guide rails 42a. The slide base 41 is disposed on the slide members 42b.

Figure 7:
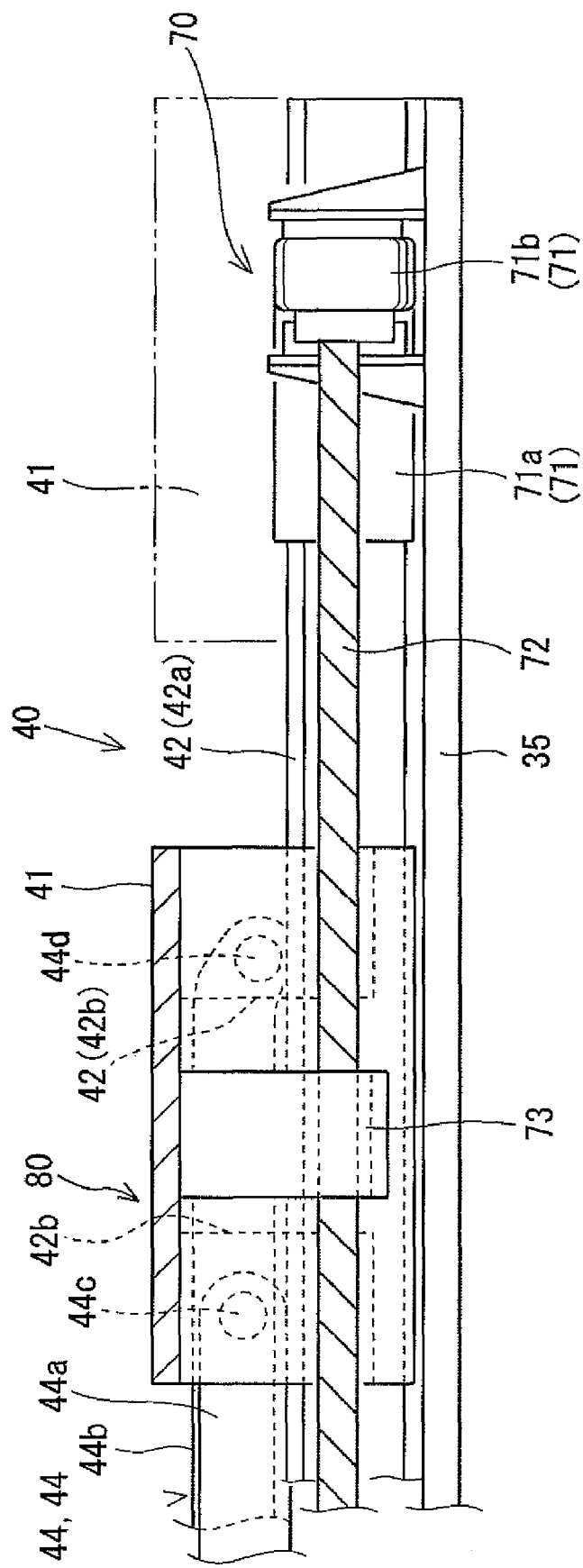
FIG. 7 is an enlarged side view of a vertically moving mechanism.

As shown in FIGS. 2 and 7, each of the guide rails 42a is an elongated bar having a rectangular shape in cross section. A pair of grooves having a V-shape in cross section are formed in opposite side surfaces of the guide rails 42a so as to longitudinally extend therealong. Each of the grooves is shaped so as to be capable of receiving a plurality of bearing balls 41a therein.

Each of the slide members 42b has a U-shape in cross section. The slide members 42b slidably engage the guide rails 42a via the bearing balls 41a that are received in the V-shaped grooves of the guide rails 42a.

The slide base 41 is disposed on the slide members 42b and is fixedly attached thereto. Thus, the slide base 41 is capable of longitudinally sliding along the guide rails 42a via the slide members 42b.

As shown in FIGS. 2 and 7, the driving mechanism 70 may preferably includes a drive motor assembly 71 attached to the rotation base 35, a threaded shaft 72 that is rotatably positioned on the rotation base 35, and a nut 73 that is fixedly attached to the slide base 41. The drive motor assembly 71 is composed of a drive motor 71a and reduction gears 71b. The threaded shaft 72 is positioned in parallel with the guide rails 42a. One end of the threaded shaft 72 is coaxially coupled to a drive shaft (not shown) of the drive motor assembly 71, so that the threaded shaft 72 can be rotated by the drive motor assembly 71. Further, the threaded shaft 72 threadably engages the nut 73 such that the nut 73 can move along the threaded shaft 72 when the threaded shaft 72 is rotated by the drive motor assembly 71. Therefore, when the drive motor 71a is rotated in normal and reverse directions, the slide base 41 can move along the guide rails 42a on the rotation base 35 between an advanced or forward-most position and a retracted or rear-most position.

As shown in FIG. 2, the four-bar linkage mechanisms (the vertically moving devices) 44 are respectively mounted on both side portions of the slide base 41. Each of the four-bar linkage mechanisms 44 may preferably include an inner link arm 44a and an outer link arm 44b. Proximal ends of the link arms 44a and 44b are respectively vertically rotatably supported on the side portions of the slide base 41 via axles 44c and 44d (FIGS. 3 and 7). Conversely, distal ends of the link arms 44a and 44b are respectively vertically rotatably connected to side portions of the vertically moving base 45 via axles 44e and 44f (FIG. 3). That is, the link arms 44a and 44b are supported by the slide base 41 at one end and support the vertically moving base 45 at the other end. Further, the inner link arm 44a and the outer link arm 44b are offset in a lateral direction in order to prevent mutual interference thereof (FIG. 2). In addition, as shown in, for example, FIG. 3, the axles 44c and 44d are positioned spaced apart from each other. Similarly, the axles 44e and 44f are positioned spaced apart from each other. Naturally, a distance between the axles 44c and 44d, a distance between the axles 44e and 44f and lengths of the link arms 44a and 44b may preferably be determined such that the vertically moving base 45 can be appropriately moved while it is maintained in a predetermined attitude.

Figure 6:
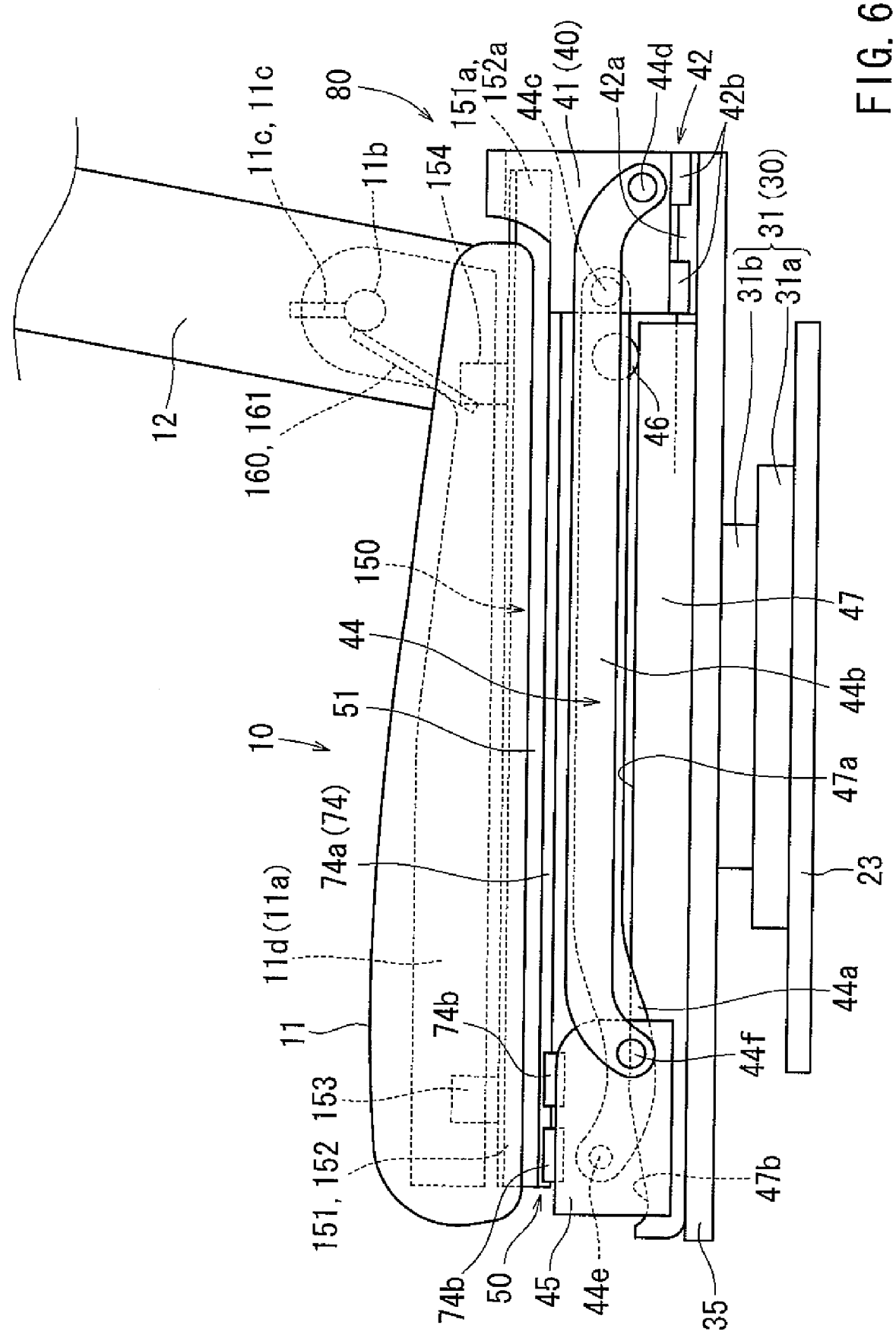
FIG. 6 is a partially enlarged detail view of FIG. 3.

As best shown in FIGS. 2 and 6, the four-bar linkage mechanisms 44 further include a pair of guide rollers 46 and a pair of guide rails 47. The guide rollers 46 are respectively rotatably attached to the inner link arms 44a. Conversely, the guide rails 47 are fixedly attached to the rotation base 35, so as to longitudinally extend in parallel with the guide rails 42a. The guide rollers 46 are respectively positioned on upper surfaces of the guide rails 47, so as to rotate therealong. Further, as shown in FIG. 6, the upper surface of each of the guide rails 47 may preferably be composed of a flattened surface portion 47a and a downwardly inclined cam surface portion 47b. The flattened surface portion 47a constitutes a substantial portion of the guide rail upper surface. Conversely, the downwardly inclined cam surface portion 47b is formed only in a forward end portion (a left end portion in FIG. 6) of the guide rail 47.

When the slide base 41 of the second lateral sliding mechanism 40 forwardly slides from the rear-most or retracted position thereof (FIGS. 3 and 4) along the guide rails 42a upon actuation of the driving mechanism 70, the link arms 44a and 44b (the four-bar linkage mechanisms 44) can move forwardly with the slide base 41 while the guide rollers 46 rotate on the flattened surface portions 47a of the guide rails 47. As shown in FIG. 5, when the slide base 41 comes close to the forward-most position thereof (i.e., when the guide rollers 46 come close to the forward ends of the guide rails 47), the link arms 44a and 44b pivot or rotate downwardly about the axles 44c and 44d while the guide rollers 46 rotate on the cam surface portion 47b of the guide rails 47 (FIG. 5). At this time, the vertically moving base 45 connected to the distal ends of the link arms 44a and 44b can move downwardly while moving forwardly.

Conversely, when the slide base 41 backwardly slides along the guide rails 42a upon reverse actuation of the driving mechanism 70, the link arms 44a and 44b (the four-bar linkage mechanisms 44) can move reversely or backwardly with the slide base 41. At this time, the link arms 44a and 44b pivot or rotate upwardly about the axles 44c and 44d while the guide rollers 46 rotate on the cam surface portion 47b of the guide rails 47. As a result, the vertically moving base 45 connected to the distal ends of the link arms 44a and 44b can move upwardly while moving backwardly toward the vehicle interior. When the slide base 41 further backwardly slides along the guide rails 42a, the link arms 44a and 44b can move backwardly with the slide base 41 while the guide rollers 46 rotate on the flattened surface portions 47a of the guide rails 47. Thus, the slide base 41 of the second lateral sliding mechanism 40 can be returned to the rear-most position thereof (FIGS. 3 and 4).

Next, the first lateral sliding mechanism 50 is intended to slide the seat main body 10 independently of the second lateral sliding mechanism 40. As shown in, for example, FIGS. 2 and 8, the first lateral sliding mechanism 50 may preferably include a slide base or seat support base 51, a guide mechanism 74 and a driving mechanism 52 as a drive source of the first lateral sliding mechanism 50. The guide mechanism 74 is composed of a pair of slide rails 74a and two pairs of guide members 74b. The slide rails 74a are attached to a lower surface of the seat support base 51 so as to extend in parallel with each other. Conversely, the guide members 74b are fixedly attached to the vertically moving base 45 so as to respectively slidably receive the slide rails 74a.

In particular, each of the slide rails 74a is an elongated bar having a rectangular shape in cross section. A pair of grooves having a V-shape in cross section are formed in opposite side surfaces of the slide rails 74a so as to longitudinally extend therealong. Each of the grooves is shaped so as to be capable of receiving a plurality of bearing balls 74c therein.

Each of the guide members 74b has a U-shape in cross section. The slide rails 74a slidably engage the guide members 74b via the bearing balls 74c that are received in the V-shaped grooves of the slide rails 74a. Thus, the seat support base 51 is capable of longitudinally smoothly sliding via the slide rails 74a and the guide members 74b.

Figure 8:
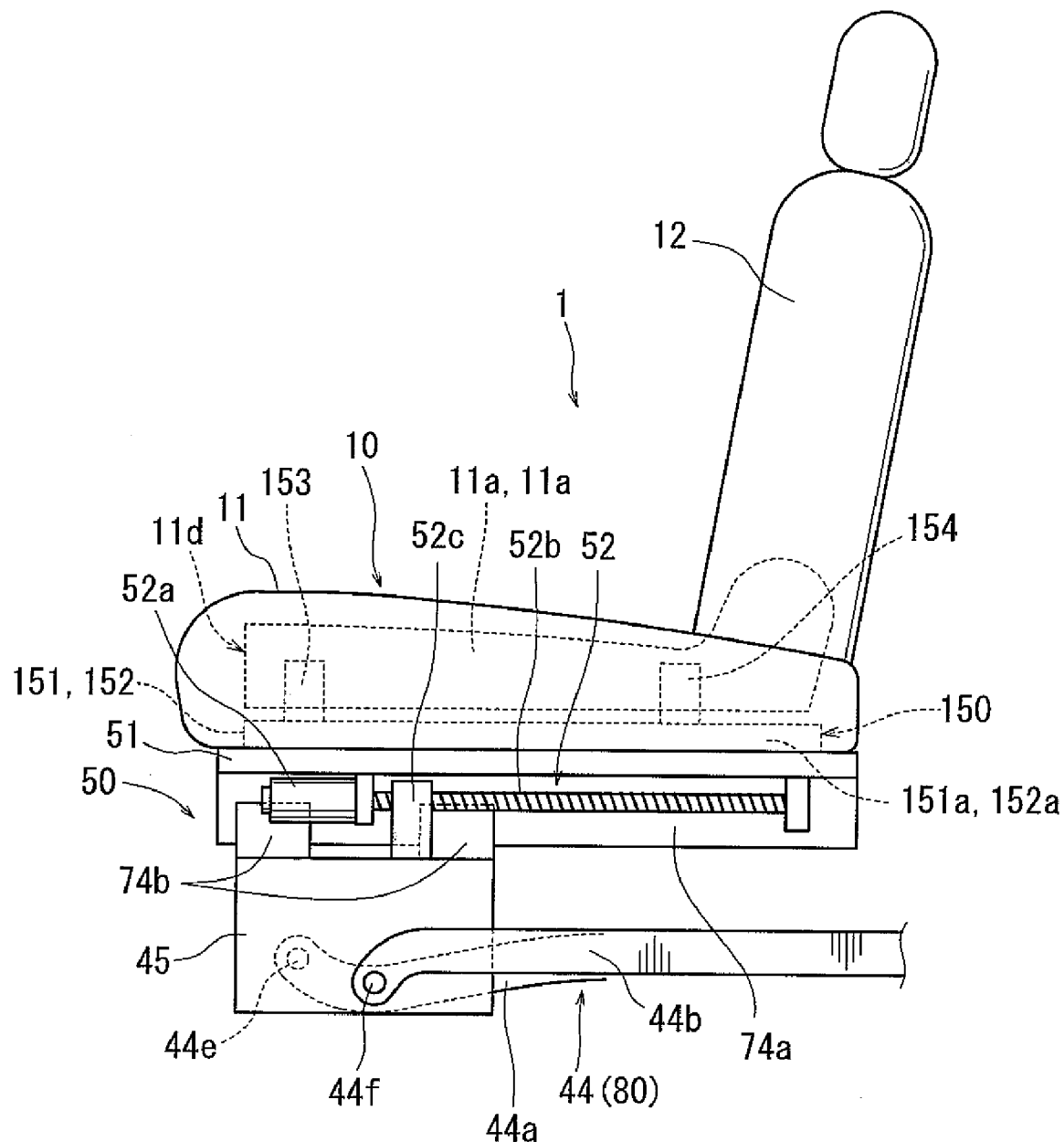
FIG. 8 is a side view of a main sliding mechanism.

As shown in FIGS. 2 and 8, the driving mechanism 52 may preferably include a drive motor 52a attached to a lower surface of the seat support base 51, a threaded shaft 52b that is rotatably attached to the lower surface of the seat support base 51, and a nut 52c that is fixedly attached to the vertically moving base 45. The threaded shaft 52b is positioned in parallel with the slide rails 74a. One end of the threaded shaft 52b is coupled to a drive shaft (not shown) of the drive motor 52a, so that the threaded shaft 52b can be rotated by the drive motor 52a. Further, the threaded shaft 52b threadably engages the nut 52c such that the threaded shaft 52b can move along the nut 52c when the threaded shaft 52b is rotated by the drive motor 52a. Therefore, when the drive motor 52a is rotated in normal and reverse directions, the seat support base 51 can longitudinally move or slide along the guide members 74b between a rear-most position (FIG. 3) and a forward-most position (FIG. 4).

As shown in FIGS. 2, 6 and 8, the seat main body 10 is attached to the seat support base 51 of the first lateral sliding mechanism 50. In particular, the frame elements 151 and 152 of the support frame 150 is fixedly attached to an upper surface of the seat support base 51, so that the seat main body 10 is integrally connected to the seat support base 51. As previously described, the seat support base 51 is slidably attached to the vertically moving base 45 via the slide rails 74a and guide members 74b. Thus, the seat main body 10 is mounted on the vertically moving base 45 via the first lateral sliding mechanism 50.

In addition, as best shown in FIG. 6, the slide base 41 of the second lateral sliding mechanism 40 may preferably be shaped so as to engage rear ends 151a and 152a of the frame elements 151 and 152 when the seat support base 51 (the seat main body 10) is moved to the rear-most position. In particular, the rear ends 151a and 152a of the frame elements 151 and 152 may preferably be extended rearwardly, so as to be introduced into the slide base 41 when the seat support base 51 (the seat main body 10) is moved to the rear-most position.

Next, an operation of the vehicle seat 1 thus constructed will be described.

When the seat main body 10 having the child seat C that is attached thereto is in the forwardly facing position in the vehicle interior, the drive motor 24a of the driving mechanism 24 is driven such that the longitudinal slide base 23 is positioned at a normal base position on the slide rails 22. Thus, the seat main body 10 is positioned at a normal seat position on the vehicle floor F.

At this time, the drive motor 32m of the driving mechanism 32 (the rotation mechanism 30) is driven normally such that the inner wheel 31b (the rotation base 35) is rotationally locked at a first rotational position. Thus, the seat main body 10 is rotationally locked at the forwardly facing position.

Also, at this time, the drive motor 71a of the driving mechanism 70 (the second lateral sliding mechanism 40) is driven such that the slide base 41 is shifted to the rear-most position (FIG. 3).

Next, in order to move the seat main body 10 from the forwardly facing position in the vehicle interior to the lower position in the vehicle exterior, the drive motor 24a of the driving mechanism 24 (the longitudinal sliding mechanism 20) is first driven, so that the longitudinal slide base 23 is moved to a base rotating position on the slide rails 22. At this time, the seat main body 10 is positioned at a seat rotation position on the vehicle floor F. Thereafter, the drive motor 32m of the driving mechanism 32 (the driving mechanism 30) is driven reversely. Upon actuation of the drive motor 32m, the inner wheel 31b (the rotation base 35) is can be horizontally reversely rotated via the output gear 32a. The drive motor 32m is continuously driven until the inner wheel 31b is rotated about 90 degrees. Thus, the inner wheel 31b (the rotation base 35) is rotated from the first rotational position to a second rotational position. As a result, the seat main body 10 is rotated to the laterally facing position (FIG. 3).

Further, the drive motor 52a of the first lateral sliding mechanism 50 is rotated in a normal direction before the rotational motion of the rotation base 35 (the seat main body 10) is completed, so as to move or advance the seat support base 51 from the vehicle interior toward the vehicle exterior (i.e., from the rear-most position toward the forward-most position) along the guide members 74b on the vertically moving base 45 of the vertically moving mechanism 80. Thus, as shown in FIG. 4, the seat main body 10 attached to the seat support base 51 can be moved or advanced from the vehicle exterior toward the vehicle exterior. At this time, the rear ends 151a and 152a of the frame elements 151 and 152 of the support frame 150 can be disengaged from the slide base 41.

Moreover, the drive motor 71a of the second lateral sliding mechanism 40 is rotated in a normal direction before the advancing motion of the seat support base 51 (the seat main body 10) is completed, so as to move or advance the slide base 41 along the guide rails 42a. As a result, as shown in FIG. 5, the vertically moving base 45 is advanced while it is downwardly moved via the four-bar linkage mechanisms 44. Thus, the seat main body 10 attached to the vertically moving base 45 via the seat support base 51 can be further moved or advanced while it is downwardly moved toward the lower position. That is, the seat main body 10 can be moved along an upwardly convexed arcuate trajectory T.

To the contrary, in order to return the seat main body 10 from the lower position in the vehicle exterior to the forwardly facing position in the vehicle interior, a reverse operation to the operation described above is performed. That is, the drive motor 71a of the second lateral sliding mechanism 40 is first rotated in a reverse direction, so as to move or retract the slide base 41 along the guide rails 42a. As a result, the vertically moving base 45 of the vertically moving mechanism 80 is moved or retracted toward the vehicle interior while it is upwardly moved via the four-bar linkage mechanisms 44. Thus, the seat main body 10 attached to the vertically moving base 45 via the seat support base 51 can be moved or retracted while it is upwardly moved. That is, the seat main body 10 can be moved along the arcuate trajectory T in an opposite direction.

On the other hand, the drive motor 52a of the first lateral sliding mechanism 50 is rotated in a reverse direction before the retracting motion of the slide base 41 is completed, so as to move or retract the seat support base 51 from the vehicle exterior toward the vehicle interior (i.e., from the forward-most position toward the rear-most position) along the guide members 74b on the vertically moving base 45. Thus, the seat main body 10 attached to the seat support base 51 can be further moved or retracted toward the vehicle interior. At this time, the rear ends 151a and 152a of the frame elements 151 and 152 of the support frame 150 are introduced into the slide base 41 (FIG. 6).

Thereafter, the drive motor 32m of the driving mechanism 32 (the driving mechanism 30) is driven normally while the drive motors 52a and 71 are driven so as to further retract the slide base 41 and the seat support base 51. Upon actuation of the drive motor 32m, the inner wheel 31b can be normally rotated. The drive motor 32m is continuously driven until the inner wheel 31b is rotated about 90 degree. Thus, the inner wheel 31b (the rotation base 35) is rotated from the second rotational position to the first rotational position. As a result, the seat main body 10 is rotated from the laterally facing position to the forwardly facing position in the vehicle interior. Thus, the seat main body 10 is positioned at the seat rotation position on the vehicle floor F.

Subsequently, the drive motor 24a of the driving mechanism 24 (the longitudinal sliding mechanism 20) is driven, so that the longitudinal slide base 23 is moved to the normal base position on the slide rails 22. As a result, the seat main body 10 is moved to the normal seat position on the vehicle floor F. Thus, the seat main body 10 is returned from the vehicle exterior to the vehicle interior.

According to the vehicle seat 1 thus constructed, the seat main body 10 can be moved between the vehicle interior and the vehicle exterior via the door opening K while the seat main body 10 is vertically moved. Therefore, the child seat C can be easily attached to the seat main body 10. In addition, it is possible to easily get an occupant (baby or infant) in and out of the child seat C attached to the vehicle seat 10.

Figure 11:
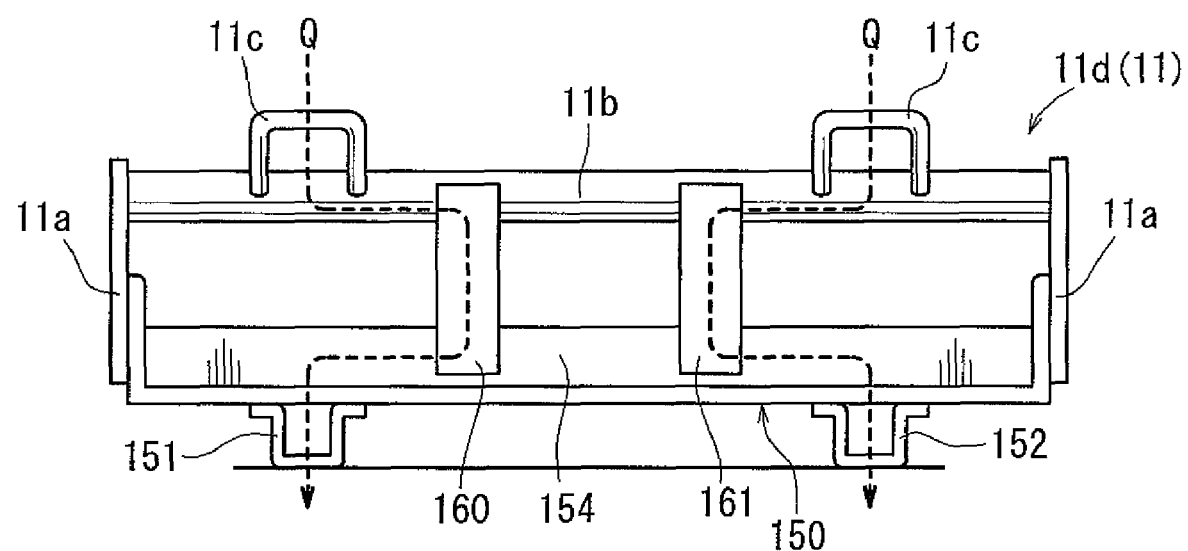
FIG. 11 is a view viewed from line XI-XI of FIG. 10.
Figure 12:
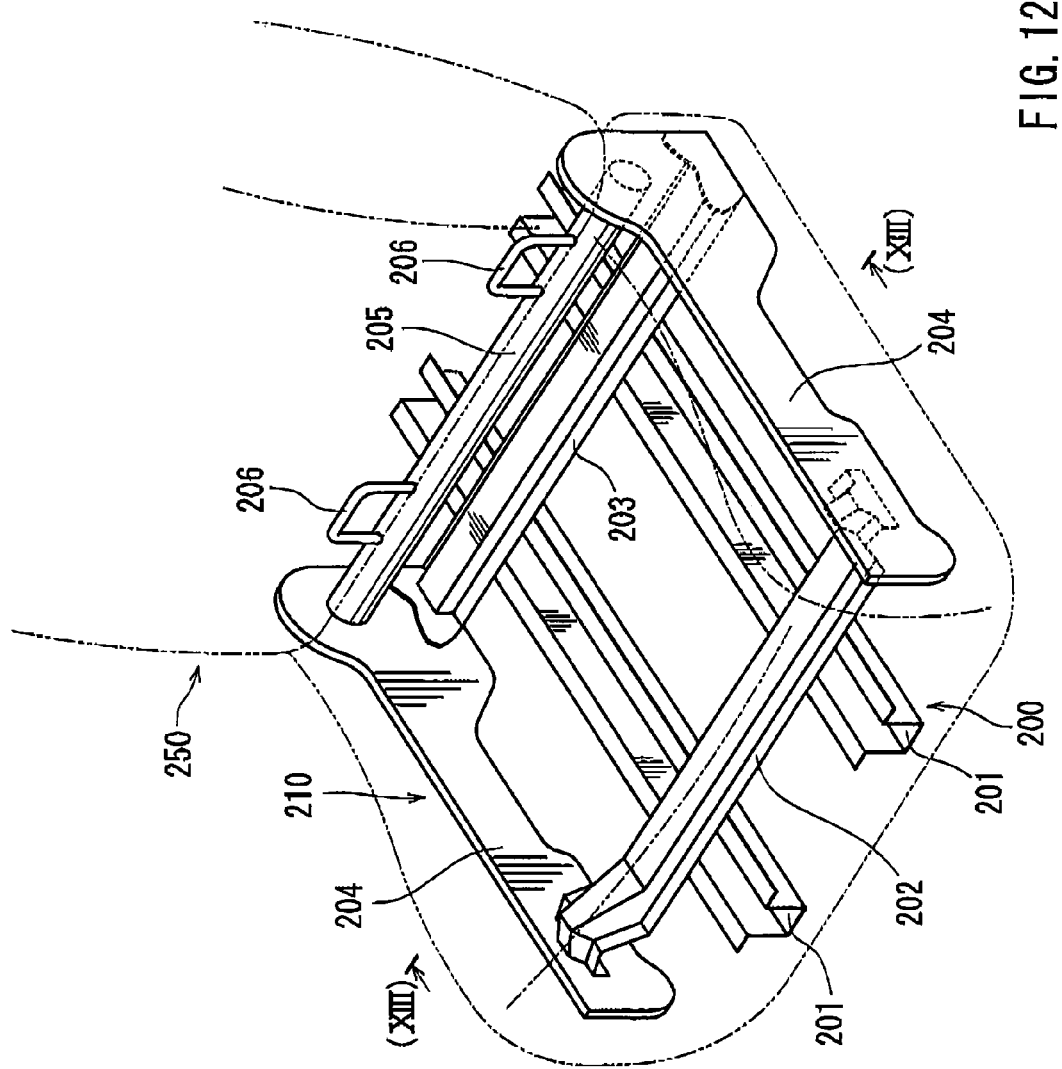
FIG. 12 is a perspective view of a seat main body of a conventional vehicle seat, which illustrate a cushion frame and a support frame.
Figure 13:
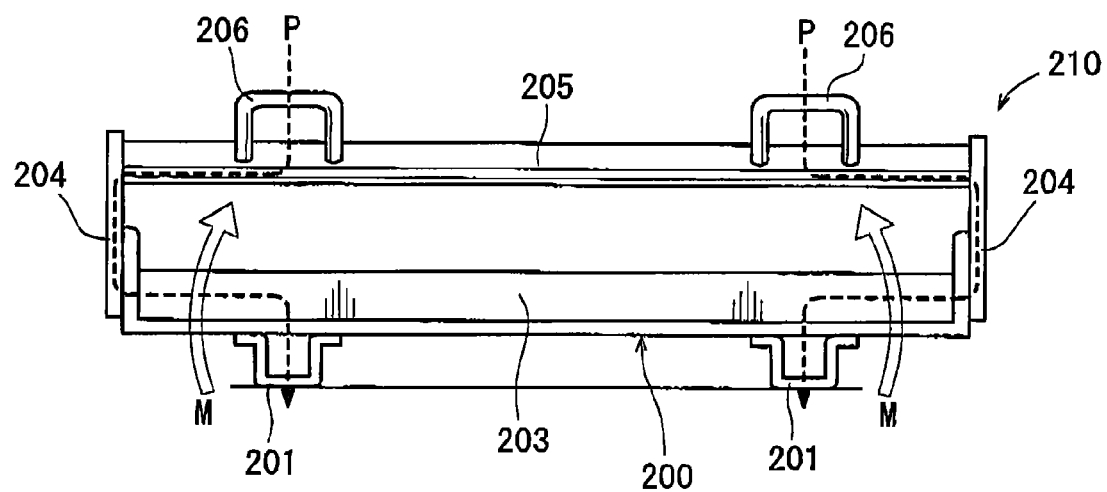
FIG. 13 is a view viewed from line XIII-XIII of FIG. 12.

Further, according to the vehicle seat 1, when a large force (a safety seat loading) is applied to the child seat C attached to the seat main body 10, the force can be transmitted to the rear lateral frame element 154 of the support frame 150 via the anchor members 11c, the anchor frame 11b and the reinforcement members 160 and 161 as shown by dot-line arrows Q in FIG. 11 because the anchor frame 11b and the rear lateral frame element 154 are connected to each other via the reinforcement members 160 and 161. That is, the force can be effectively prevented from being transmitted to the side frame elements 11a of the cushion frame 11d. This means that the force can substantially be transmitted to only a central portion of the rear lateral frame element 154. As a result, the force can be effectively prevented from being applied to both ends of the rear lateral frame element 154 as upward moments, so that the rear lateral frame element 154 can be effectively prevented from being deformed or damaged. Therefore, the seat main body 10 can be effectively prevented from moving in the vehicle seat 1. As a result, the child seat C attached to the seat main body 10 can be reliably restrained or immobilized with respect to the vehicle floor F. Thus, the occupant (baby or infant) sitting on the child seat C can be reliably restrained or immobilized with respect to the vehicle floor F even if a vehicle collision happens.

In addition, the rear ends 151a and 152a of the frame elements 151 and 152 of the support frame 150 can be introduced into the slide base 41 when the seat main body 10 (the seat support base 51) is moved to the rear-most position. Therefore, the support frame 150 can be rigidly integrated with the slide base 41 of the second lateral sliding mechanism 40. As a result, the force applied to the child seat can be reliably received by the second lateral sliding mechanism 40 (the vertically moving mechanism 80), so that the child seat C can be further firmly immobilized with respect to the vehicle floor F. As a result, the occupant sitting on the child seat C can be further reliably restrained or immobilized with respect to the vehicle floor F.

Various changes and modifications may be made to the present invention without departing from the scope of the invention. For example, in the representative embodiment, the longitudinal sliding mechanism 20, the rotation mechanism 30, the second lateral sliding mechanism 40 and the first lateral sliding mechanism 50 are constructed so as to respectively be electrically operated via the drive motors 24a, 32m, 71a and 52a. However, these mechanisms 20, 30, 40 and 50 can be constructed so as to respectively be manually operated.

Moreover, in the embodiment, the rear (second row) left seat is exemplified as the vehicle seat 1. However, the vehicle seat 1 may be a front passenger seat, a rear (second row) right seat and a third seat.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

The invention claimed is:

1. A vehicle seat, comprising:
a seat main body having a seat cushion;
a rotation mechanism that is arranged and constructed to horizontally rotate the seat main body with respect to a vehicle floor;
a vertically moving mechanism that is arranged and constructed to vertically move the seat main body while moving the seat main body between vehicle interior and vehicle exterior;
a seat support that is capable of attaching the seat main body to the vertically moving mechanism, and
a first sliding mechanism that is arranged and constructed to horizontally move the seat main body,
wherein a cushion frame of the seat cushion is composed of a pair of longitudinal side frame elements, an anchor frame positioned between the side frame elements, and anchor members attached to the anchor frame and capable of being detachably connected to a child seat,
wherein the anchor frame is connected to the seat support via reinforcement members such that a force applied to the anchor frame via the anchor members can be transmitted to the seat support via the reinforcement members,
wherein the vertically moving mechanism comprises a second lateral sliding mechanism that is disposed on a rotation base of the rotation mechanism, a vertically moving device that is attached to a slide base of the second lateral sliding mechanism, so as to vertically move depending upon the sliding motion of the slide base,
wherein the seat support is slidably attached to the vertically moving device via the first sliding mechanism, so that the seat main body can vertically move while moving between the vehicle interior and the vehicle exterior when the vertically moving device is moved depending upon the sliding motion of the slide base,
wherein a rear portion of the seat support is capable of engaging the slide base of the second lateral sliding mechanism when the seat main body is moved to a rear-most position in a condition that the slide base is in a retracted position,
wherein the seat support is composed of a pair of longitudinal frame elements and a pair of front and rear lateral frame elements,
wherein the front and rear lateral frame elements extend between the side frame elements of the cushion frame and are connected thereto, so that the cushion frame is integrated with the seat support, and
wherein the anchor frame is connected to the rear frame element via the reinforcement members between the longitudinal frame elements.

2. The vehicle seat as defined in claim 1, wherein rear ends of the longitudinal frame elements of the seat support extend rearwardly, so as to be introduced into the slide base of the second lateral sliding mechanism when the seat main body is moved to the rear-most position in the condition that the slide base is in the retracted position.

* * * * *